(No Model.)

B. F. HAUGH & P. F. LEACH.
CUSHIONED CAR WHEEL.

No. 443,047. Patented Dec. 16, 1890.

Witnesses
Inventors
Benjamin F. Haugh
Porter F. Leach
By their Attorney

UNITED STATES PATENT OFFICE.

BENJAMIN F. HAUGH, OF INDIANAPOLIS, INDIANA, AND PORTER F. LEACH, OF CHICAGO, ILLINOIS, ASSIGNORS TO THE CUSHION CAR WHEEL COMPANY, OF INDIANAPOLIS, INDIANA.

CUSHIONED CAR-WHEEL.

SPECIFICATION forming part of Letters Patent No. 443,047, dated December 16, 1890.

Application filed September 18, 1890. Serial No. 365,376. (No model.)

*To all whom it may concern:*

Be it known that we, BENJAMIN F. HAUGH, a citizen of the United States, residing at Indianapolis, in the county of Marion and State of Indiana, and PORTER F. LEACH, a citizen of the United States, residing at Chicago, in the county of Cook and State of Illinois, have invented new and useful Improvements in Cushioned Car-Wheels, of which the following is a specification.

Our invention consists in certain improvements in that class of car-wheels having annular cushions interposed between the tire and the periphery of the wheel; and the object of our invention is to provide means whereby the tire can be readily attached to or detached from the center of the wheel without removing said center from the axle on which it is mounted; also, means for transferring the end-thrust directly to the tire and the wheel center, thus preventing in a great measure undue stress to fall on the tire-securing bolts or rivets; also, means whereby the cushion is relieved from any excessive pressure that may be brought to bear upon it, thereby adding to the safety and materially assisting the durability of the entire wheel and its axle. We attain these objects by the construction illustrated in the accompanying drawings, in which—

Figure 1:
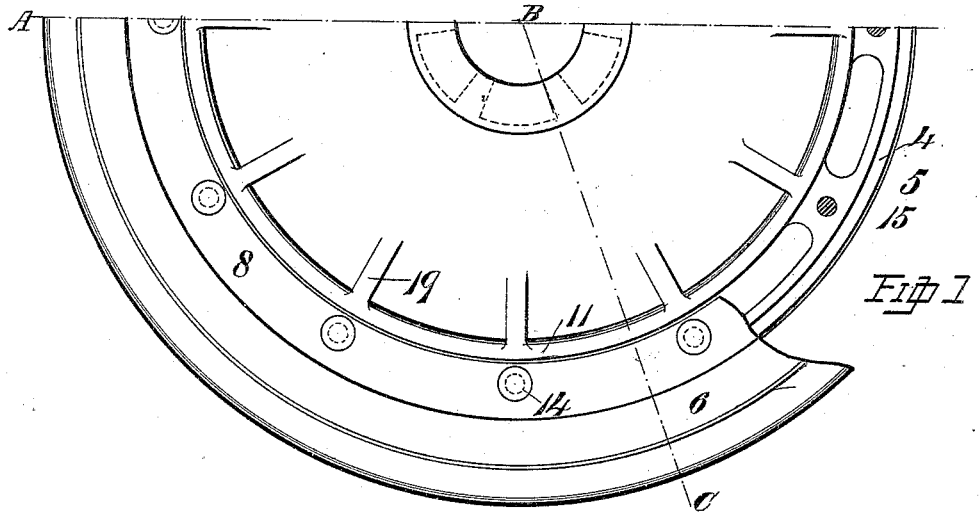
Figure 2:
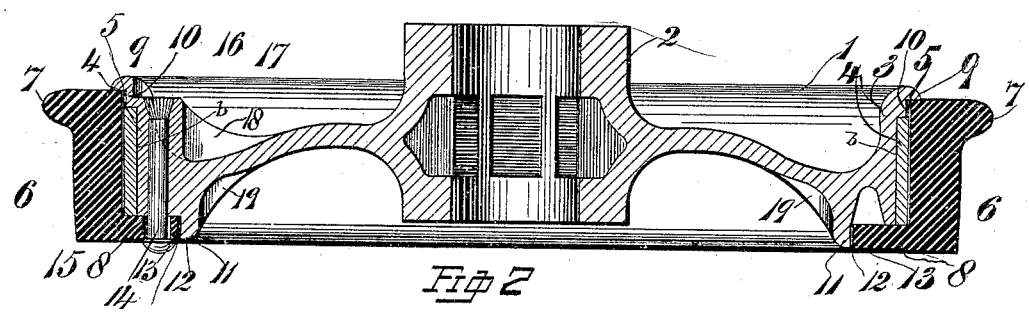
Figure 3:
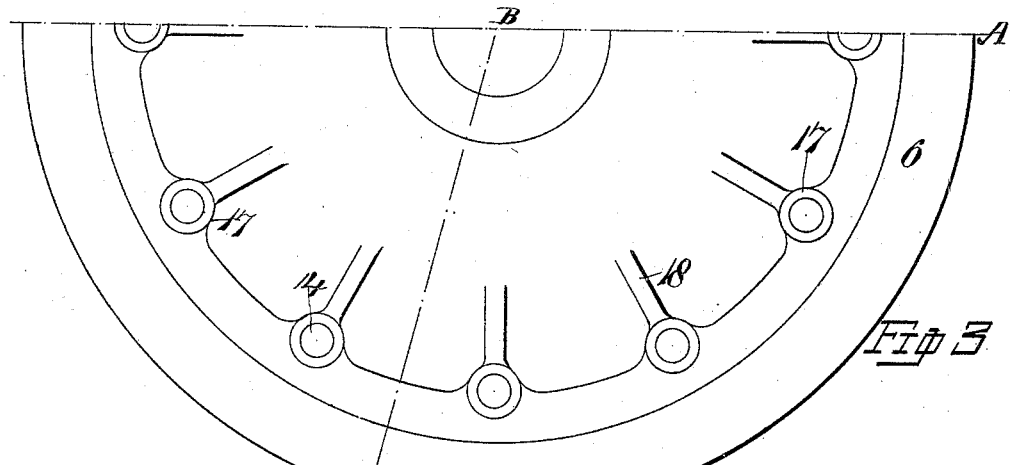

Figure 1 is a part elevation of the outer face of the wheel. Fig. 2 is a section of the same through the lines *x x*, (see Figs. 1 and 3,) and Fig. 3 is a part elevation of the inner face of the wheel.

Similar numbers of reference designate like parts throughout the several views.

1 designates the center or body of the wheel, preferably of crucible cast-steel. 2 is its hub, and 3 is its peripheral flange turned slightly tapering to neatly fit into the annular cushion 4, also of a similarly-tapered bore, and 5 is a sheathing or liner surrounding the said cushion for the purpose of protecting the same from abrasion and wrinkling when fitting on the tire.

6 designates the tire, having its tread of the usual or any suitable form, and provided at or near its outer face and on the face opposite to the flange 7 with the inwardly-projecting flange 8, formed integral therewith, said tire slightly tapered to correspond with the taper of the exterior of the cushion.

9 designates the peripheral thrust-flange of the center of the wheel formed integral therewith and provided for the purpose of relieving the tire-flange 8 of any excessive thrust, as that due to the shock of an end blow.

10 is the inner safety bearing strip or shoulder of an exterior diameter slightly less than the interior greater diameter of the liner 5 of the tire, and consequently of less diameter than that of the exterior of the cushion at its largest end.

11 is the outer safety bearing-lip, having its bearing-face 12 of less diameter than that of the inner face 3 of the flange 8 and clearing an amount equal to the clearance between the inner safety-lip 10 and the liner 5 of the tire.

14 designates the securing-rivets of the tire (bolts may be also used, but we prefer rivets) passing through the holes 15, said holes of a slightly greater diameter in the flange 8 than in the center 1, said rivets provided with countersunk heads 16 to neatly fit the correspondingly-formed holes in the bosses 17 of the center of the wheel.

18 and 19 are re-enforcing webs formed on the center 1 and radial with the center thereof and with the centers of the bosses, which are provided for the purpose of strengthening the center 1 at the securing-bosses.

It is very important that the rivets be driven from the outer face of the wheel and riveted or headed on the countersunk end, said end being previously heated and driven in the usual way to completely fill the "countersink." It is clear that if the rivets are driven from the inner face of the wheel and riveted at their outer ends the holes in the tire-flange 8 will, in consequence of the operation of forming the outer head, be completely filled up, thus causing all stresses to be transferred to the rivets to shear them off.

It is obvious that when an excessive stress is applied to the tire, as by a blow caused by a rail-joint, frog, or other obstruction on the tracks, the safety-shoulder and the outer lip of the wheel-center will bear directly on the tire, thus preventing an undue strain to be applied to the cushion to destroy it. It is also obvious that any longitudinal blow that may strike the face of the flange 7 of the tire will be distributed and divided between the lip or flange 9 and the flange 8 of the tire.

Having thus fully described the nature and construction of our invention, what we claim, and desire to cover by Letters Patent, is—

1. In a cushioned car-wheel, the combination, with the center and the tire thereof, of an annular flange extending outwardly from the face of said center, an inner peripheral safety-shoulder, an inwardly-projecting flange formed on the said tire at its outer face, an elastic cushion interposed between the tire and the bearing periphery of the center, and suitable means for securing the tire to the center, whereby the tire may be removed from said center without detaching the latter from its axle, all substantially as and for the purpose set forth.

2. In a cushioned car-wheel, the combination, with the center and the tire thereof, of the flanges 8 and 9, the safety-shoulder 10, the annular lip 11, a suitable cushion interposed between the periphery of said center and tire, a sheathing surrounding said cushion, and suitable bolts or rivets having countersunk heads for securing said center to said tire, all substantially as and for the purpose set forth.

In testimony whereof I have hereunto set my hand in the presence of two subscribing witnesses.

BENJAMIN F. HAUGH.

Witnesses:
T. R. BELL,
GEO. P. ANDERSON.

In testimony whereof I have hereunto set my hand in the presence of two subscribing witnesses.

PORTER F. LEACH.

Witnesses:
GEORGE STRANGE,
JULIUS G. W. CLEMENS.